Feb. 13, 1923.
A. MILLER.
ANIMAL TRAP.
FILED DEC. 1, 1921.
1,444,934.
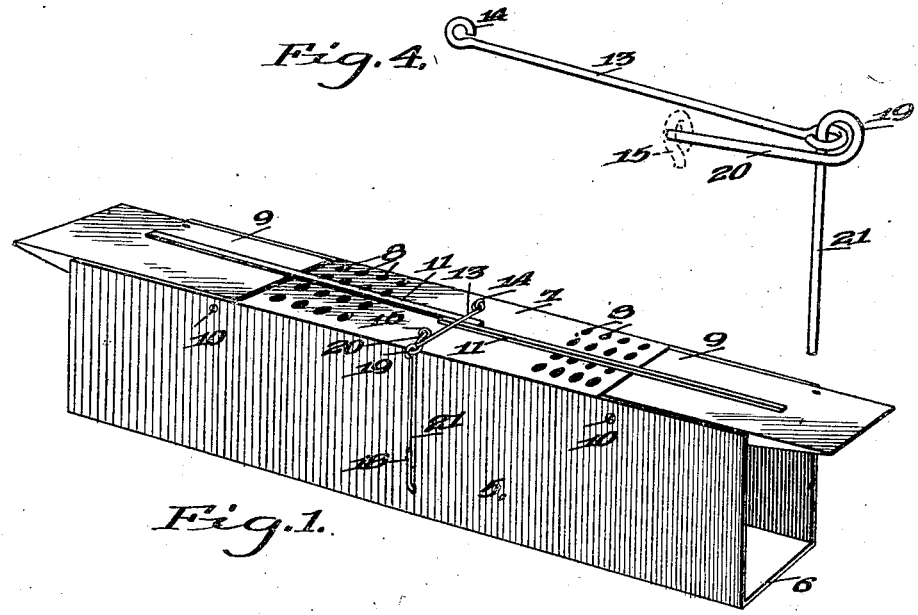
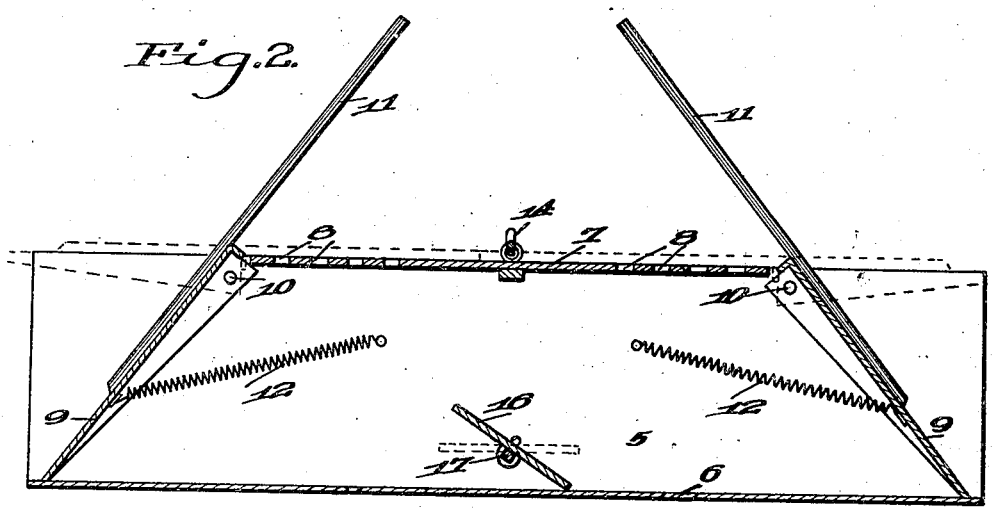
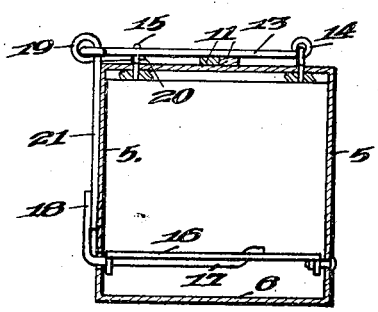
INVENTOR.
Anderson Miller,
BY
ATTORNEY.

Patented Feb. 13, 1923.

1,444,934

UNITED STATES PATENT OFFICE.

ANDERSON MILLER, OF SHELBYVILLE, INDIANA.

ANIMAL TRAP.

Application filed December 1, 1921. Serial No. 519,232.

*To all whom it may concern:*

Be it known that I, ANDERSON MILLER, a citizen of the United States, residing at Shelbyville, in the county of Shelby and State of Indiana, have invented certain new and useful Improvements in Animal Traps, of which the following is a specification.

The object of the present invention is to provide an inexpensive and yet thoroughly practicable and effective trap for catching rodents or other small animals.

A further and important object is to provide trip mechanism that is easily operable to release the trap.

In the accompanying drawings:—

Figure 1 is a perspective view of the preferred embodiment of the invention showing the trap set, Figure 2 is a longitudinal sectional view with the trap closed or sprung, Figure 3 is a cross sectional view, Figure 4 is a detail perspective view of the holding top and latch.

In the structure disclosed, an elongated rectangular open-ended body is provided, and is preferably constructed of sheet metal, comprising sides 5, a bottom 6 and a top 7, the latter being shorter than the bottom and sides and preferably having perforations 8 for ventilation purposes. Closures 9 are provided for the open ends, and are in the form of doors pivoted as illustrated at 10 to the side walls 5 directly adjacent to the ends of the top 7. These doors 9 are longer than the vertical height of the body, and thus when in closed position assume diagonal or outwardly and downwardly inclined positions, as illustrated in Figure 2. Each door is provided with a lever arm 11, and said arms are adapted to lie flat upon the top 7, with their free ends overlapped when the doors are in elevated or open positions. Coiled springs 12, secured to the doors and to one of the side walls, serve to swing the doors to closed positions.

For the purpose of holding the doors open, a bar or rod 13 is pivoted, as shown at 14, to the top 7, so that it will overlie the overlapped ends of the lever arms 11. A keeper eye 15 is located on the top 7 on the opposite side of said arms 11 to the pivot 14. A trip or treadle plate 16 is located in the central portion of the body, being pivoted between its ends by means of a rock shaft 17 journaled in the side walls 5. This rock shaft terminates in an upstanding arm 18. A latch 19 is pivotally mounted on the free end of the holding bar 13 and comprises angularly disposed arms, one of the arms 20 being shorter than the other and being adapted to engage in the keeper eye 15. The other arm 21 is adapted to lie frictionally alongside the adjacent side wall 5, and is detachably engaged behind the trip arm 18.

When the trap is set the arms 11 are placed beneath the holding arm 13 and the latch 19 is engaged in the keeper 15, and the arms 21 behind the trip arm 18, causing the same to bear frictionally against said wall of the container thus preventing the accidental release of the latch. An animal therefore attempting to pass through the body will step upon the treadle 16, thereby turning the rock shaft 17 and the crank arm 18, and releasing the latch 19. The springs 12 will thereupon act to close the doors 9.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention

Having thus fully described my invention what I claim as new, and desire to secure by Letters Patent, is:—

A trap comprising an elongated angular body having open ends, closure doors for the ends pivoted on the body and having upstanding arms, a holding bar pivoted on the body and adapted to pass over the arms when the doors are opened, a keeper eye on the top of the body, a pivoted trip in the body having an external arm, the latch having angular disposed arms and an eye extending upwardly therefrom at its angle, said eye having secured thereto the free end of said bar, one of said arms detachably engages in the keeper eye, the other detachably engaging behind the trip arm.

In testimony whereof, I affix my signature in the presence of two witnesses.

ANDERSON MILLER.

Witnesses:
 F. G. STRONG,
 ELMER HURST.